US012312083B2

(12) United States Patent
Noskowicz

(10) Patent No.: US 12,312,083 B2
(45) Date of Patent: May 27, 2025

(54) SYSTEMS AND METHODS FOR AERODYNAMIC DEPLOYMENT OF WING STRUCTURES

(71) Applicant: SWIFT ENGINEERING, INC., San Clemente, CA (US)

(72) Inventor: Christopher Noskowicz, San Clemente, CA (US)

(73) Assignee: SWIFT ENGINEERING, INC., San Clemente, CA (US)

( * ) Notice: Subject to any disclaimer, the term of this patent is extended or adjusted under 35 U.S.C. 154(b) by 0 days.

(21) Appl. No.: 18/484,394

(22) Filed: Oct. 10, 2023

(65) Prior Publication Data

US 2024/0116624 A1    Apr. 11, 2024

Related U.S. Application Data

(60) Continuation of application No. 17/111,259, filed on Dec. 3, 2020, now Pat. No. 11,814,165, which is a
(Continued)

(51) Int. Cl.
*B64C 9/00* (2006.01)
*B64U 10/25* (2023.01)
(Continued)

(52) U.S. Cl.
CPC ............... *B64C 9/00* (2013.01); *B64U 10/25* (2023.01); *B64U 20/50* (2023.01); *B64U 70/50* (2023.01);
(Continued)

(58) Field of Classification Search
CPC ....... B64C 9/00; B64C 2009/005; B64C 3/56; B64U 30/12; B64U 20/50; B64U 70/50;
(Continued)

(56) References Cited

U.S. PATENT DOCUMENTS 1,603,711 A    10/1926    Peck et al.
1,662,406 A    3/1928    Thompson
(Continued)

FOREIGN PATENT DOCUMENTS

DE    2421627 A1    11/1975
EP    2475575 B1    11/2017
(Continued)

OTHER PUBLICATIONS

Advanced VTOL Technologies, "Products: Hammerhead VTOL Aircraft", http://www.avtolt.com/products/hammerhead.php, exact publication date unknown (web page last visted Mar. 22, 2016).
(Continued)

*Primary Examiner* — Rodney A Bonnette
(74) *Attorney, Agent, or Firm* — Perkins Coie LLP

(57) ABSTRACT

A method of deploying an unmanned aerial vehicle (UAV) includes launching a UAV and deploying at least one portion of a wing assembly from a stowed configuration to a deployed configuration in which the at least one portion of the wing assembly extends away from a body of the UAV. Deploying the portion of the wing assembly, which may be an outboard portion of a wing assembly, includes deflecting an aerodynamic control surface on the at least one portion of the wing assembly to cause an aerodynamic force to move the portion of the wing assembly into the deployed configuration without assistance from a spring or motor. An unmanned aerial vehicle (UAV) includes a UAV having a body and a plurality of wing assemblies carried by the body, at least a portion of a wing assembly is deployable using aerodynamic forces and without assistance form a spring or motor.

20 Claims, 14 Drawing Sheets

Related U.S. Application Data division of application No. 16/128,432, filed on Sep. 11, 2018, now abandoned.

(51) Int. Cl.
*B64U 20/50* (2023.01)
*B64U 30/10* (2023.01)
*B64U 70/50* (2023.01)
*B64U 80/70* (2023.01)
B64U 50/13 (2023.01)
B64U 101/31 (2023.01)

(52) U.S. Cl.
CPC ........ *B64C 2009/005* (2013.01); *B64U 30/10* (2023.01); *B64U 50/13* (2023.01); *B64U 80/70* (2023.01); *B64U 2101/31* (2023.01)

(58) Field of Classification Search
CPC ........ B64U 10/25; B64U 30/10; B64U 50/13; B64U 2101/31; B64U 80/70
See application file for complete search history.

(56) References Cited

U.S. PATENT DOCUMENTS

| | | |
|---|---|---|
| 1,804,312 A | 5/1931 | Brown |
| 1,928,326 A | 9/1933 | Raymond |
| 1,951,817 A | 3/1934 | Blount |
| 2,014,377 A | 9/1935 | Fitzgerald |
| D113,019 S | 1/1939 | Silverstein |
| 2,481,502 A | 9/1949 | Downing |
| 2,578,578 A | 12/1951 | Francis |
| 2,621,001 A | 12/1952 | Roman |
| 2,678,783 A | 5/1954 | Francis |
| 2,825,514 A | 3/1958 | Johann |
| 3,000,593 A | 9/1961 | Gerhard et al. |
| 3,142,455 A | 7/1964 | Burke |
| 3,408,767 A | 11/1968 | Anderson |
| 3,568,201 A | 3/1971 | Spoonamore et al. |
| 3,586,262 A | 6/1971 | Sherman |
| 4,336,914 A | 6/1982 | Thomson |
| 4,410,151 A | 10/1983 | Hoeppner et al. |
| 4,471,923 A | 9/1984 | Hoeppner et al. |
| 4,667,899 A | 5/1987 | Wedertz |
| 5,108,051 A | 4/1992 | Montet et al. |
| 5,192,037 A | 3/1993 | Moorefield |
| 5,356,094 A | 10/1994 | Sylvain |
| 5,423,706 A | 6/1995 | Chase |
| 5,765,783 A | 6/1998 | Albion |
| 5,782,427 A | 7/1998 | Hermach |
| 5,823,468 A | 10/1998 | Bothe |
| 5,890,441 A | 4/1999 | Swinson et al. |
| 6,056,237 A | 5/2000 | Woodland |
| 6,098,927 A | 8/2000 | Gevers |
| 6,186,443 B1 | 2/2001 | Shaffer |
| 6,260,798 B1 | 7/2001 | Casiez et al. |
| 6,367,738 B1 | 4/2002 | Wadleigh |
| D461,159 S | 8/2002 | Miralles et al. |
| 6,561,455 B2 | 5/2003 | Capanna |
| 6,655,631 B2 | 12/2003 | Austen-Brown |
| 6,769,648 B2 | 8/2004 | Klima |
| 7,185,847 B1 | 3/2007 | Bouchard et al. |
| 7,410,124 B2 | 8/2008 | Miller et al. |
| 7,506,837 B2 | 3/2009 | Parks |
| 8,256,704 B2 | 9/2012 | Lundgren |
| 8,434,710 B2 | 5/2013 | Hothi et al. |
| 8,505,846 B1 | 8/2013 | Sanders |
| 8,602,348 B2 | 12/2013 | Bryant |
| 8,876,039 B2 | 11/2014 | Lubenow et al. |
| 9,187,174 B2 | 11/2015 | Shaw |
| 9,453,705 B2 | 9/2016 | Sylvia et al. |
| 9,481,457 B2 | 11/2016 | Alber |
| 9,550,567 B1 | 1/2017 | Erdozain et al. |
| 9,567,088 B2 | 2/2017 | Godlasky et al. |
| 9,731,820 B1 | 8/2017 | Godlasky et al. |
| 9,776,719 B2 | 10/2017 | Elkins et al. |
| 9,789,950 B1 | 10/2017 | Most et al. |
| 9,821,909 B2 | 11/2017 | Moshe |
| 2002/0074452 A1 | 6/2002 | Ingram |
| 2003/0006339 A1 | 1/2003 | Capanna |
| 2003/0094537 A1 | 5/2003 | Austen-Brown |
| 2004/0026563 A1 | 2/2004 | Moller et al. |
| 2004/0159227 A1 | 8/2004 | Richards |
| 2005/0006525 A1 | 1/2005 | Byers et al. |
| 2005/0178879 A1 | 8/2005 | Mao |
| 2005/0242236 A1 | 11/2005 | Purcell |
| 2005/0274845 A1 | 12/2005 | Miller et al. |
| 2009/0045295 A1 | 2/2009 | Lundgren et al. |
| 2010/0252690 A1 | 10/2010 | Hothi et al. |
| 2010/0264260 A1 | 10/2010 | Hammerquist |
| 2011/0042509 A1 | 2/2011 | Bevirt et al. |
| 2011/0226174 A1 | 9/2011 | Parks |
| 2011/0315806 A1 | 12/2011 | Piasecki et al. |
| 2012/0091257 A1 | 4/2012 | Wolff et al. |
| 2012/0205488 A1 | 8/2012 | Powell et al. |
| 2012/0261523 A1 | 10/2012 | Shaw et al. |
| 2012/0280080 A1 | 11/2012 | Lubenow et al. |
| 2012/0286102 A1 | 11/2012 | Sinha et al. |
| 2013/0146716 A1 | 6/2013 | Gettinger |
| 2013/0206921 A1 | 8/2013 | Paduano et al. |
| 2015/0102157 A1 | 4/2015 | Godlasky et al. |
| 2015/0225071 A1 | 8/2015 | Tighe |
| 2015/0267996 A1 | 9/2015 | Su et al. |
| 2015/0284075 A1 | 10/2015 | Alber |
| 2016/0311545 A1 | 10/2016 | Parks et al. |
| 2016/0347476 A1 | 12/2016 | Andryukov |
| 2016/0378120 A1 | 12/2016 | Creasman et al. |
| 2017/0144749 A1 | 5/2017 | Tao et al. |
| 2017/0291684 A1 | 10/2017 | Alley et al. |
| 2017/0369150 A1 | 12/2017 | Finklea et al. |
| 2018/0072413 A1 | 3/2018 | Moshe |
| 2019/0002083 A1 | 1/2019 | Wilson et al. |
| 2020/0269967 A1 | 8/2020 | Chen et al. |

FOREIGN PATENT DOCUMENTS

| | | |
|---|---|---|
| RU | 2132289 C1 | 6/1999 |
| WO | 2011066400 A1 | 6/2011 |
| WO | 2012113576 A1 | 8/2012 |
| WO | 2013048339 A1 | 4/2013 |
| WO | 2016003530 A2 | 1/2016 |
| WO | 2016046787 A1 | 3/2016 |

OTHER PUBLICATIONS

Aeroalias, "Why has the folding wing option of the Boeing 777 never been ordered?", Aviation Stack Exchange Web Site, URL: https://aviation.stackexchange.com/questions/19289/why-has-thefolding-wing-option-of-the-boeing-777-never-been-ordered [retrieved on Aug. 19, 2019].

Aerovironment, Switchblade Datasheet, available at https://www.avinc.com/images/uploads/product_docs/SB_Datasheet_2017_Web_rv1.1.pdf, copyright 2017, exact publication date unknown, web page visited Aug. 31, 2018.

Aerovironment, Unmanned Aircraft Systems, available at: https://www.avinc.com/uas/adc/, website copyright 2018, exact publication date unknown, web page visited Aug. 31, 2018.

Area-I Inc., "ALTIUS in the News," available at: https://areai.aero/aircraft/altius-air-launchedtube-integrated-unmanned-system/, website copyright 2018, exact publication date unknown, web page visited Aug. 31, 2018.

Area-I Inc., "Tube Launched Aircraft," available at https://areai.aero/aircraft/tube-launchedaircraft/, website copyright 2018, exact publication date unknown, web page visited Aug. 31, 2018.

Boeing, "Heliwing Aircraft", 1995.

Carey, Bill, "Helicopter Operator Places Launch Order for Flexrotor UAV", Aviation International News Online, http://www.ainonline.com/aviation-news/aerospace/2015-01-05/helicopter-operator-places-launch-order-flexrotor-uav, Jan. 15, 2015.

EPO, "Extended European Search Report", for EP Application No. 17786296.8, mail date Sep. 30, 2019.

(56) References Cited

OTHER PUBLICATIONS

Eshel, Tamir, "Sikorsky, Aurora Flight Sciences to Develop VTOL X-Planes for DARPA", Defense Update, http://defense-update.com/20131213_sikorsky-aurora-flight-sciences-develop-vtol-x-planes-darpa.html, Dec. 13, 2013.
Industry Network Engineering and Services, "Unmanned aircraft", Industry Network Engineering and Services, http://www.industry.co.jp/ines/, exact publication date unknown, (web page last visited Mar. 18, 2016).
Japan Aerospace Exploration Agency, "Four-engine told wing VTOL aircraft", Aeronautical Technology Directorate, http://www.aero.jaxa-jp/eng/research/frontier/vtol/qtw/, exact publication date unknown (web page last visited Mar. 22, 2016).
Krossblade Aerospace Systems LLC, "Krossblade SkyProwler Multi-Mission VTOL Transformer Drone", Kickstarter Campaign, https://www.kickstarter.com/projects/350745213/krossblade-skyprowler-multi-mission-vtoltransform/updates, exact publication date unknown, (web page last visited Mar. 18, 2016).
LAK, "LAK Genesis 2 Glider", https://en.wikipedia.org/wiki/LAK_Genesis_2, 1994, 2.
Lee, R.E., "Convair XFY-1 Pogo", National Air and Space Museum, http://airandspace.si.edu/collections/artifact.cfm?object=nasm_A19730274000, Sep. 18, 2000.
Liszewski, Andrew, "Tilting Wings Let This New Air Hogs RC Plane Hover Like a Helicopter", Toyland Blog, http://toyland.gizmodo.com/tilting-wings-let-this-new-air-hogs-rc-plane-hover-like-1720002243, Jul. 24, 2015.
Madrigal, Alexis C., "Inside Google's Secret Drone-Delivery Program", The Atlantic, http://www.theatlantic.com/technology/archive/2014/08/inside-googles-secret-drone-delivery-program/379306/ Aug. 28, 2014.
Moore, Mark D., "NASA Puffin Electric Tailsitter VTOL Concept", NASA Technical Reports Server, http://ntrs.nasa.gov/archive/nasa/casi.ntrs.nasa.gov/20110011311.pdf, Sep. 13, 2010.
RC Groups, "Discussion: Tail Sitting VTOL," http://www.rcgroups.com/forums/showthread.php?t=1473333&page=4, Aug. 9, 2011.
Stone, H., et al., "Preliminary Design of a Tandem-Wing Tail-Sitter UAV Using Multi-Disciplinary Design Optimisation", Intl Aerospace Congress, Sydney, AU, 707-720, Feb. 1997.
Stone, H., et al., "The T-Wing: A VTOL UAV for Defense and Civilian Applications", UAV Australia Conference, Melbourne, AU, 13 pgs, Feb. 2001.
Stone, R. H., et al., "Optimization of Transition Manoeuvres for a Tail-Sitter Unmanned A nowy Vehicle (UAV)", Australian International Aerospace Congress, Paper 105, Canberra, Mar. 2001, 14 pgs.
SUAS News, "Arcturus UAV Upgrades the JUMP15 VTOL UAV", sUAS News, http://www.suasnews.com/2014/12/arcturus-uav-upgrades-the-jump15-vtol-uav, Dec. 5, 2014.
SUAS News, "Sony Ventures Unveils Drone Prototype", sUAS News, http://www.suasnews.com/2015/08/sony-venture-unveils-drone-prototype/, Aug. 24, 2015.
SUAS News, "The Airbus Group's Quadcruiser concept is validated in flight tests", sUAS News, http://www.suasnews.com/2014/12/the-airbus-groups-quadcruiser-concept-is-validated-in-flight-tests/, Dec. 8, 2014.
SUAS News "Vertex VTOL UAV", sUAS News, http://www.suasnews.com/2014/12/vertex-vtol-uav/, Dec. 26, 2014.
University of Sydney, "University of Sydney T-Wing Website", http://www.aeromech.usyd.edu.au/uav/twing/, Sep. 2002.
USPTO, CPC symbol B64C 11/28 "Collapsible or foldable [propeller] blades", http://www.uspto.gov/web/patents/classification/cpc/pdf/cpc-scheme-B64C.pdf, May 2016, 18 pgs.
USPTO, "International Search Report and Written Opinion", for PCT/US19/48527 Nov. 5, 2019, 9 pages.
Wikipedia, "Tail-sitter", https://en.wikipedia.org/wiki/Tail-sitter, exact publication date unknown, (web page last visited Mar. 18, 2016).
Xcraft, "X PlusOne", http://xcraft.io/x-plusone-drone/, exact publication date unknown, (web page last visited Mar. 18, 2016).
Xylakantsky, Ivan, "Chinese VTOL UAV VMA-01" YouTube, https://www.youtube.com/watch?v=GNTZ14ecUs8, Jun. 6, 2012.

SYSTEMS AND METHODS FOR AERODYNAMIC DEPLOYMENT OF WING STRUCTURES

CROSS REFERENCE TO RELATED APPLICATIONS

This application is a continuation of U.S. patent application Ser. No. 17/111,259, filed Dec. 3, 2020, which is a divisional of U.S. patent application Ser. No. 16/128,432, filed Sep. 11, 2018, both of which are incorporated herein by reference in their entirety.

BACKGROUND

One way to stow and deploy unmanned aerial vehicles (UAVs) is with a tube system. Tube-launched UAVs may be able to carry greater payload than other UAVs because they typically do not include the weight penalty associated with a traditional take-off sequence of events. In a tube-launched system, a UAV may be collapsed or folded into a stowed configuration and inserted into a tube that functions like a mortar or cannon to launch the UAV. For example, a burst of pneumatic pressure or explosive may force the UAV out of the tube at a sufficient velocity to provide an initial ballistic trajectory. At some point along the ballistic trajectory, wings or other aerodynamic surfaces may deploy from the UAV until it is in a deployed configuration. In the deployed configuration, the UAV may carry out flight operations. Existing UAV deployment systems, including tube deployment systems, rely on springs or motors to deploy the wings or other aerodynamic surfaces to a deployed configuration for flight. Springs and motors involve substantial weight penalties, and, in some cases, may be unreliable or prone to failure.

SUMMARY

In some embodiments, a method of deploying an unmanned aerial vehicle (UAV) includes launching a UAV and deploying at least one portion of a wing assembly from a stowed configuration to a deployed configuration in which the at least one portion of the wing assembly extends away from a body of the UAV and is configured to provide lift for horizontal flight. Deploying the at least one portion of the wing assembly includes deflecting an aerodynamic control surface on the at least one portion of the wing assembly to cause an aerodynamic force to move the at least one portion of the wing assembly into the deployed configuration without assistance from a spring or motor. In some embodiments, minimal assistance from a spring or motor may be used.

The at least one portion of the wing assembly may be an outboard portion of the wing assembly and the method may further include deploying an inboard portion of the wing assembly by rotating the inboard portion of the wing assembly away from the body of the UAV using a spring element or a motor. The inboard portion of the wing assembly carries the outboard portion of the wing assembly. Methods may further include deploying one or more stabilizers attached to a trailing portion of the UAV, from a stowed configuration to a deployed configuration.

In some embodiments, an unmanned aerial vehicle (UAV) system includes a UAV having a body and a plurality of wing assemblies carried by the body. At least one wing assembly of the plurality of wing assemblies is configurable between a stowed configuration and a deployed configuration and includes an inboard portion and an outboard portion rotatably connected to the inboard portion. The inboard portion is rotatable relative to the body between the stowed configuration in which the inboard portion, the outboard portion, and the body are in an overlapping arrangement, and the deployed configuration in which the inboard portion extends along a direction away from the body. The outboard portion is rotatable relative to the inboard portion between the stowed configuration and the deployed configuration, in which the outboard portion extends away from the inboard portion. The inboard portion and the outboard portion form a lifting surface configured to provide aerodynamic lift for the UAV. The outboard portion includes an aerodynamic control surface, which may be an aileron, configured to cause the outboard portion to rotate from the stowed configuration to the deployed configuration. A latch may be positioned to hold the outboard portion in the deployed configuration. The UAV system may include a launch system, which may be a tube launch system with a launch tube, wherein the launch tube is configured to receive the UAV with the at least one wing assembly in the stowed configuration, and wherein the launch tube is configured to launch the UAV.

Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the views.

DETAILED DESCRIPTION

Figure 1:
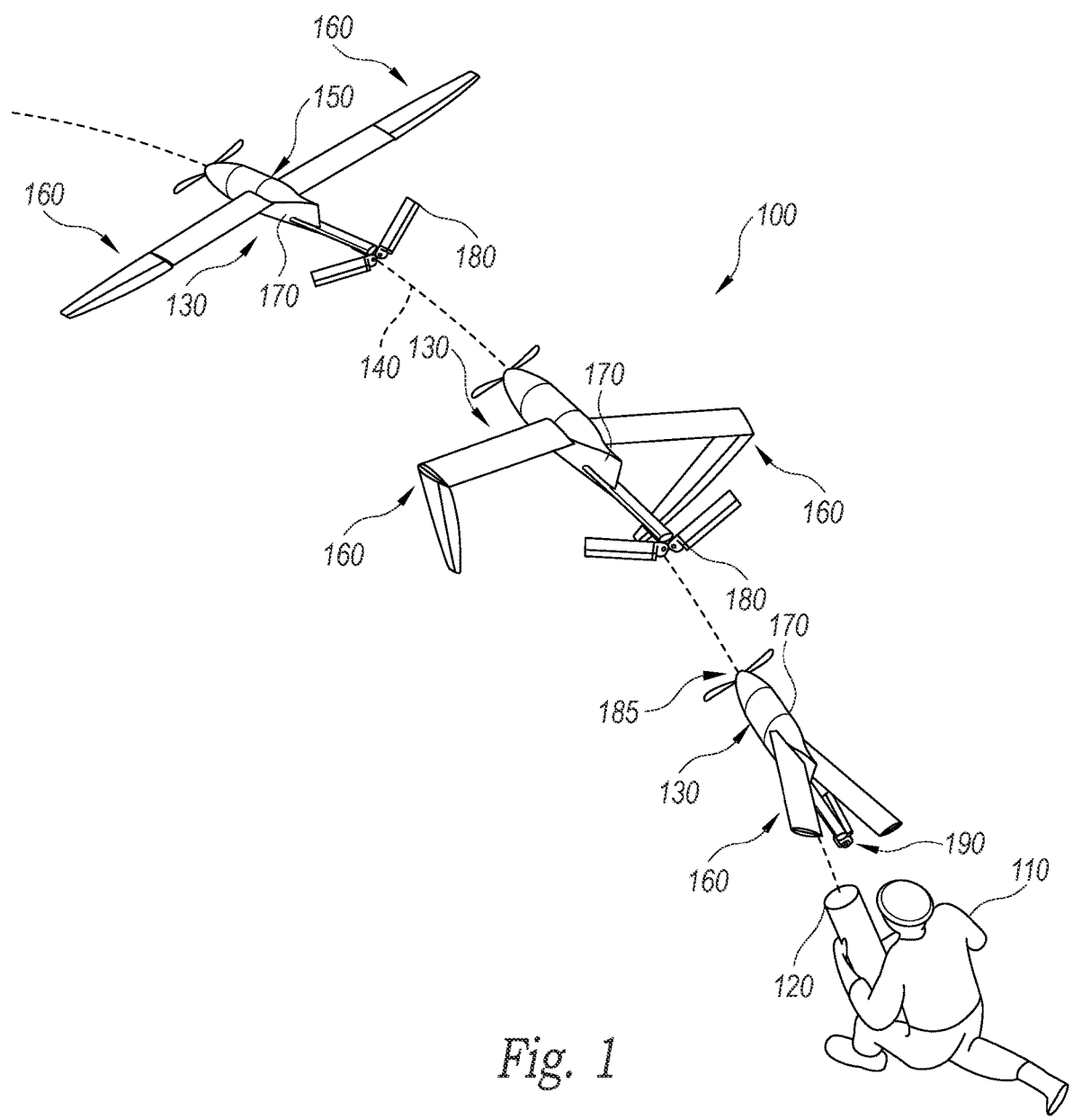
FIG. 1 illustrates a launch sequence according to various embodiments of the present technology.

The present technology is directed to systems and methods for aerodynamic deployment of aerodynamic structures, such as wing structures. Various embodiments of the technology will now be described. The following description provides specific details for a thorough understanding and enabling description of these embodiments. One skilled in the art will understand, however, that the invention may be practiced without many of these details. Additionally, some well-known structures or functions, such as structures or functions common to aircraft, unmanned aerial vehicles (UAVs), motors, engines, springs, launch systems for UAVs, or control systems for aircraft, may not be shown or described in detail so as to avoid unnecessarily obscuring the relevant description of the various embodiments. Accordingly, embodiments of the present technology may include additional elements or exclude some of the elements described below with reference to FIGS. 1-14, which illustrate examples of the technology.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list. Further, unless otherwise specified, terms such as "attached" or "connected" are intended to include integral connections, as well as connections between physically separate components.

Specific details of several embodiments of the present technology are described herein with reference to aircraft. Aircraft that may implement the present technology may include unmanned aircraft such as UAVs or drones, powered aircraft such as aircraft with jet engines, turbofan engines, or propellers, unpowered aircraft such as gliders, or other suitable types of aircraft.

As explained in the following disclosure, the present technology provides deployment of aerodynamic surfaces, such as wings or portions of wing assemblies, using aerodynamic forces instead of, or in addition to, forces from springs or motors. For example, the present technology reduces the weight and complexity associated with traditional spring-assisted or motor-assisted deployment mechanisms by omitting springs or motors and relying instead on aerodynamic forces to facilitate deployment. In other words, deployment of one or more aerodynamic surfaces or portions of aerodynamic surfaces may be performed without assistance (or with only minimal assistance) from a spring, motor, or other driving mechanism.

Turning now to the drawings, FIG. 1 illustrates a launch sequence 100 according to various embodiments of the present technology. An operator 110, which may be a human, a mechanism, a computer, or another suitable initiating device, causes a tube 120 of a tube launch system to expel an aircraft 130 in a generally upward, angled direction relative to the horizon. In some embodiments, any suitable launch angle sufficient to give an initial velocity to the aircraft 130 may be used, such as an entirely horizontal or entirely vertical launch. The initial velocity puts the aircraft 130 on a generally ballistic trajectory 140, along which the aircraft 130 reconfigures itself from a stowed configuration in the tube (see FIG. 2) to a deployed configuration 150 for flight. Reconfiguration or deployment processes according to embodiments of the present technology are explained in detail below and illustrated in the appended figures. Along the trajectory 140, the aircraft 130 is moving at a sufficient velocity to create aerodynamic forces on the aircraft 130, which are used to deploy aerodynamic surfaces of the aircraft 130.

For example, aerodynamic surfaces, such as wing assemblies 160, may be overlapping or aligned with a longitudinal axis of a main body of the aircraft 130, such as a fuselage 170, when the aircraft 130 is in the tube 120, but after expulsion from the tube 120, the wing assemblies 160 may deploy to reconfigure the aircraft 130 into the deployed configuration 150. In the deployed configuration 150, the wing assemblies 160 and any portions thereof extend away from the main body of the aircraft 130. After the aircraft 130 has deployed some or all of its aerodynamic surfaces, the aircraft 130 may begin flight operations using lift from the aerodynamic surfaces, such as horizontal flight under its own power or an unpowered glide. Other aerodynamic surfaces 180, such as horizontal stabilizers, vertical stabilizers, or vertazontals (angled stabilizers with orientations between those of horizontal and vertical stabilizers, shown in FIG. 1) may deploy while the aircraft is traveling along the trajectory 140, or after the aircraft 130 has begun flight operations. Although a tube launch sequence 100 is illustrated, in some embodiments, the aircraft 130 may be placed on an initial generally ballistic trajectory 140 using other launch processes, such as manual throwing by a human operator, a rail launch system, a slingshot, or other suitable operations to give the aircraft 130 an initial trajectory.

Figure 2:
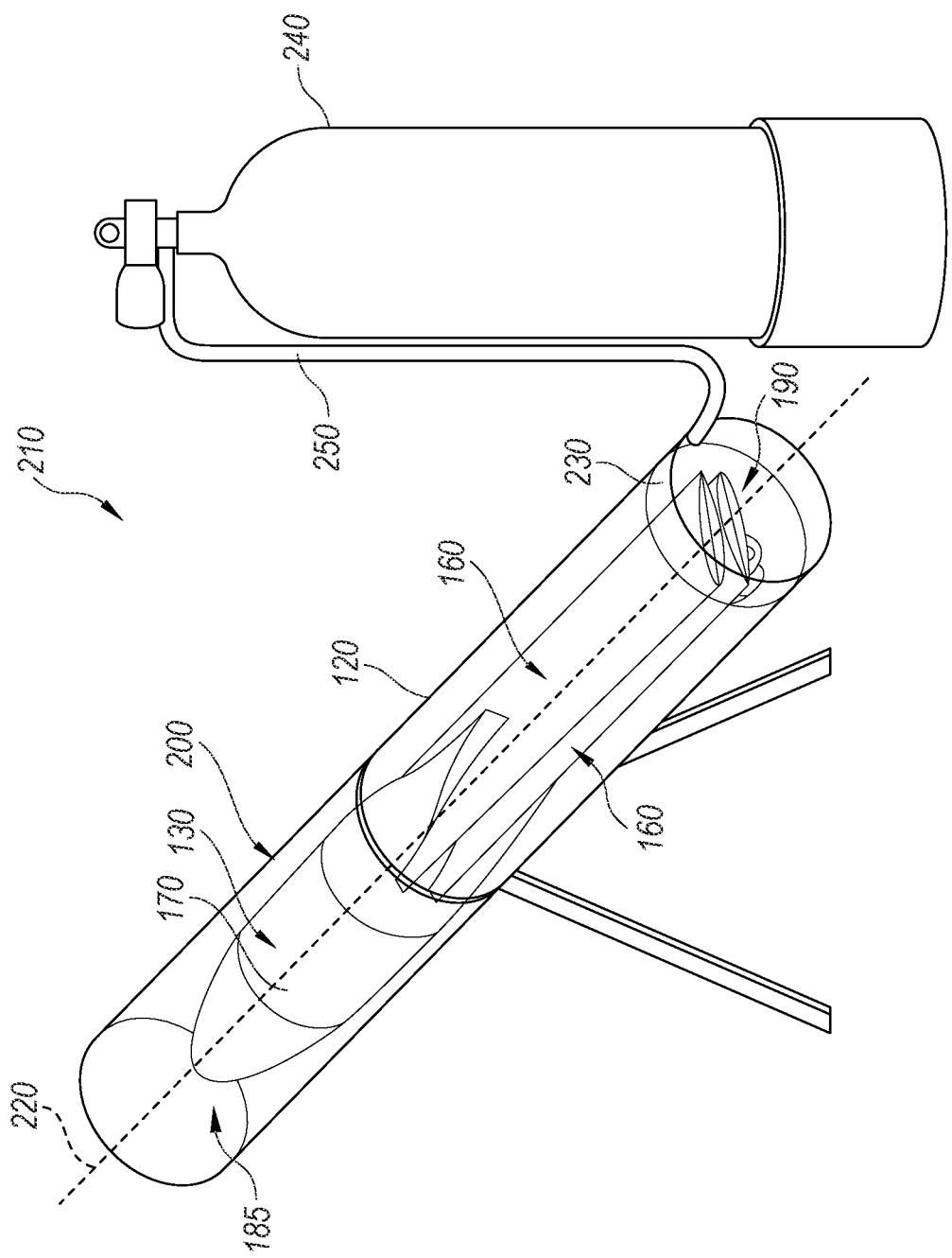
FIG. 2 illustrates a schematic view of an aircraft in a stowed configuration inside the tube of a tube launch system.

FIG. 2 illustrates a schematic view of an aircraft 130 in a stowed configuration 200 inside the tube 120 of a tube launch system 210. FIG. 2 generally illustrates the aircraft 130 ready to be expelled from the tube 120. In some embodiments, the wing assemblies 160 are folded and generally aligned with a longitudinal axis 220 of a main body of the aircraft 130, such as the fuselage 170. By folding and aligning the wing assemblies 160, they fit inside the tube 120. Launch systems for providing an initial generally ballistic trajectory for the aircraft 130 may have any suitable form, and need not be tube launch systems, such as the tube launch system 210.

A tube launch system 210 may include a wadding element 230 within the tube 120, between the aircraft 130 and the bottom of the tube 120. The wadding element 230 may be a piece of foam or other element suitable for transferring force from air pressure to force upon the aircraft 130 to expel the aircraft 130 from the tube 120. The tube launch system 210 may include an air pressure source 240 which may provide air pressure, such as a burst of air pressure, optionally through a hose 250 connected to the tube 120 beneath the wadding element 230. Upon pressurization, the air pressure may cause the wadding element 230 to push the aircraft 130 to expel the aircraft 130 out of the tube 120 along a generally ballistic trajectory (such as the trajectory 140 illustrated in FIG. 1) with the nose 185 of the aircraft 130 leading the trailing end or tail 190 (opposite the nose 185). In other embodiments, pressure on the wadding element 230 to cause the tube 120 to expel the aircraft 130 may come from an explosive device, a gas generator device, a spring, or another device suitable for rapidly creating force or pressure. In yet other embodiments, a wadding element 230 may be omitted and other ways of providing pressure to expel the aircraft from the tube 120 may be used. After expulsion from the tube 120, the aircraft 130 may deploy its aerodynamic surfaces or other parts, as described in additional detail below.

Figure 3:
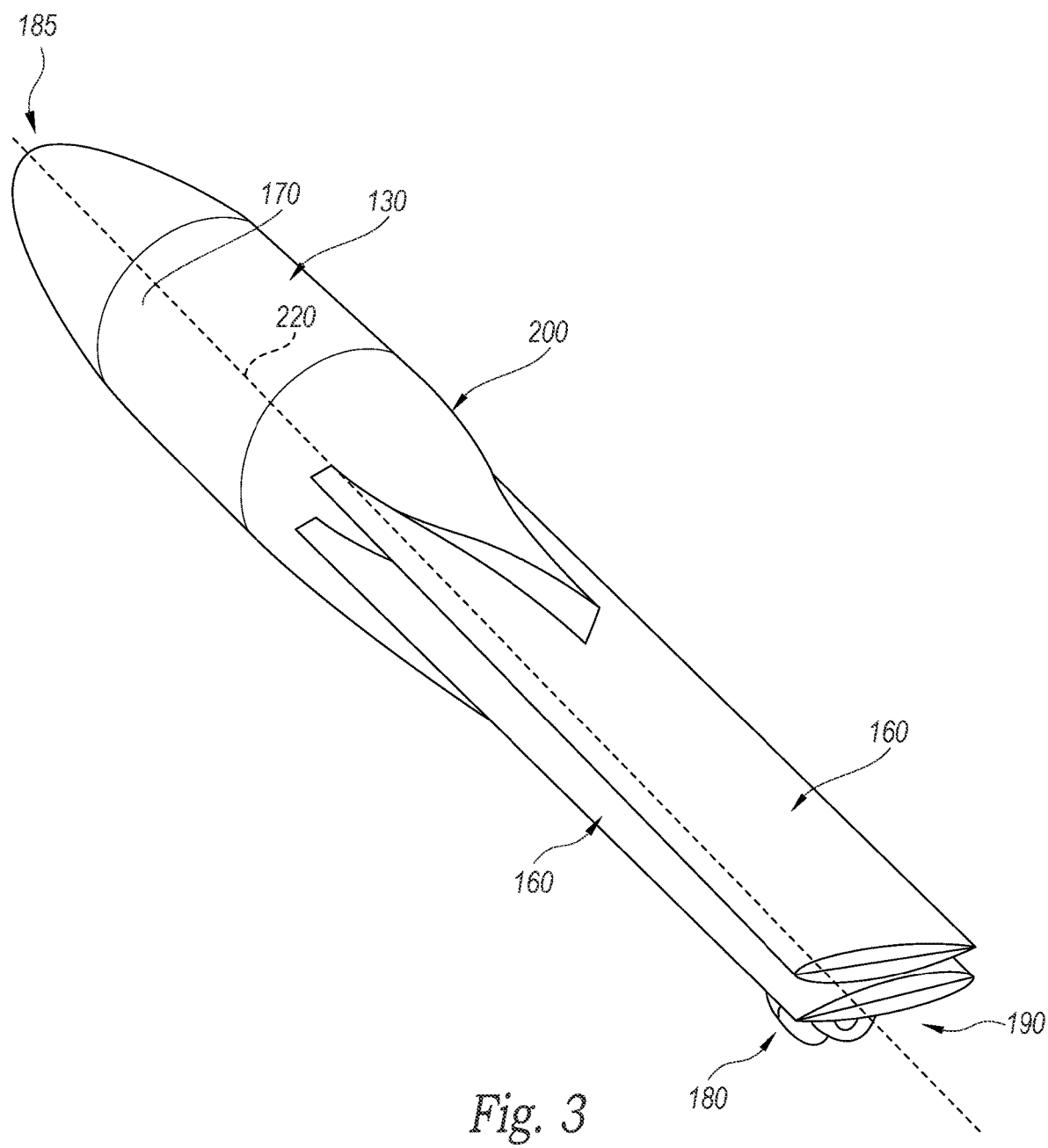
FIG. 3 illustrates a view of an aircraft in a stowed configuration suitable for placement in a launch system, such as in the launch tube illustrated in FIG. 2, in accordance with an embodiment of the present technology.

FIG. 3 illustrates a view of an aircraft 130 in a stowed configuration 200 suitable for use in a launch system, such as in the launch tube 120 illustrated in FIG. 2. In the stowed configuration 200, the wing assemblies 160 may overlap each other and the main body (such as the fuselage 170) of the aircraft 130. The wing assemblies 160 may include an inboard portion, which is a portion positioned closer to or attached to the fuselage 170 when the aircraft is in a deployed configuration (see FIGS. 4-11 and corresponding description). The wing assemblies 160 may include an outboard portion, which is a portion positioned farther from the fuselage 170 than the inboard portion (see FIGS. 4-11 and corresponding description). In the stowed configuration 200, the wing assemblies 160 may be folded, such that the inboard portion and the outboard portion of each wing assembly 160 overlap each other and the main body of the aircraft 130, as described in additional detail below. When the aircraft 130 is in the stowed configuration 200, additional aerodynamic surfaces 180 (only partially visible in FIGS. 2 and 3) may also be stowed and overlap portions of the aircraft 130. FIG. 3 may also illustrate the aircraft 130 shortly after being expelled from the launch tube 120 (FIG. 2), before its aerodynamic surfaces, such as the wing assemblies 160 and other aerodynamic surfaces 180 have begun to deploy.

Figure 4:
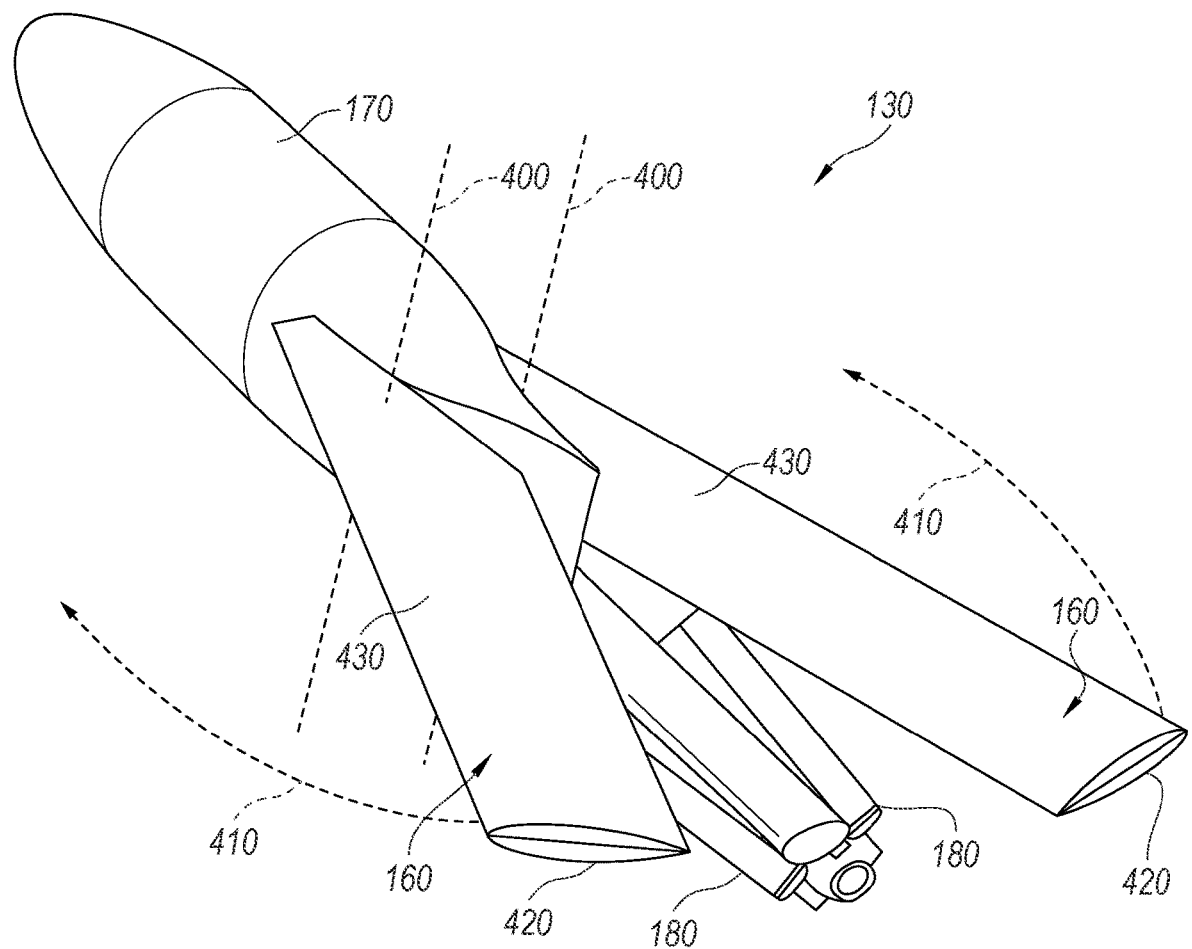
FIGS. 4-8 illustrate views of the aircraft in partially-stowed or partially-deployed configurations as the aircraft progresses along a launch trajectory (such as the trajectory illustrated in FIG. 1).

FIG. 4 illustrates a view of the aircraft 130 in a partially-stowed or partially-deployed configuration, between being fully stowed or fully deployed. FIG. 4 shows the aircraft 130 as its aerodynamic surfaces (such as wing assemblies 160 and other aerodynamic surfaces 180) have begun to deploy. For example, initial deployment may happen outside of the tube 120 (FIG. 2). The wing assemblies 160 have begun to spread or extend outwardly from the fuselage 170. In some embodiments, the wing assemblies 160 may rotate about axes 400 and rotate along pathways 410. At this point in deployment, outboard portions 420 of the wing assemblies may or may not yet have begun to rotate away from the inboard portions 430 of the wing assemblies, which are connected to the fuselage 170. Accordingly, outboard portions 420 of the wing assemblies are shown as being only slightly visible in FIG. 4. The inboard portions 430 of the wing assemblies 160 carry the outboard portions 420 as the inboard portions 430 rotate and deploy outwardly.

In some embodiments, a motor, a spring, or another suitable actuating device may cause the wing assemblies 160 (and, in particular, the inboard portions 430) to rotate to spread or extend outwardly from the fuselage 170 (about pathways 410). In some embodiments, other aerodynamic surfaces 180, such as vertazontals, horizontal stabilizers, or vertical stabilizers, may be prevented from deploying until the wing assemblies 160 are clear of their rotational pathways. The other aerodynamic surfaces 180 may also be driven by a spring (such as a torsional spring) or motor to cause the other aerodynamic surfaces 180 to rotate into a flight configuration when their rotational pathways are clear. Although motors, springs, or other actuating devices may cause some portions of the wing assemblies 160 to extend or deploy, embodiments of the present technology include deployment of portions of wing assemblies 160 or other aerodynamic surfaces without the aid of motors, springs, or other actuating devices. Instead, the present technology includes deployment of aerodynamic surfaces using only gravity, only aerodynamic forces, or a combination of only gravity and aerodynamic forces.

Figure 5:
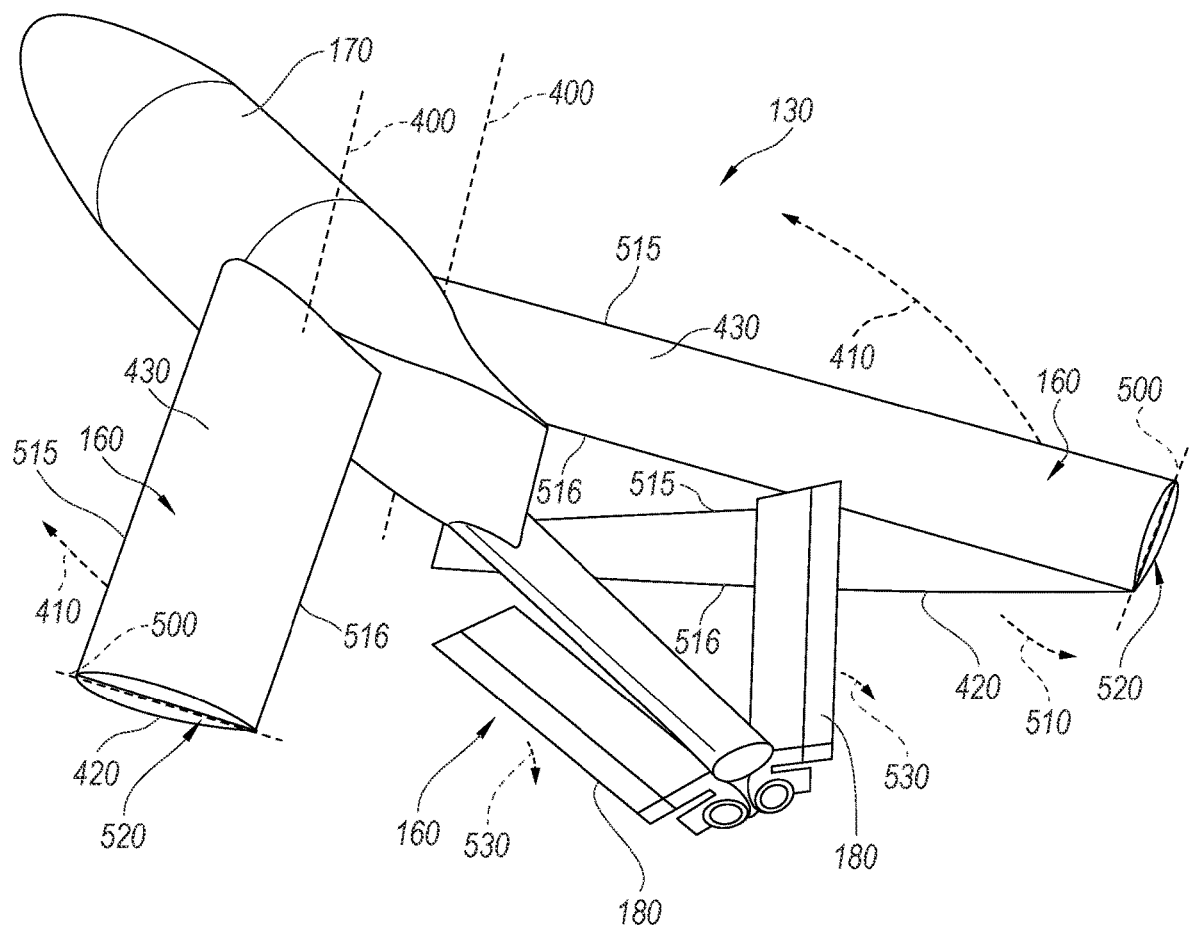

FIG. 5 illustrates a view of the aircraft 130 in another partially-stowed or partially-deployed configuration as the aircraft progresses along a launch trajectory (such as the trajectory 140 in FIG. 1). FIG. 5 shows the outboard portions 420 of the wing assemblies 160 (only one is shown due to the perspective) rotating away from the inboard portions 430. Optionally, in some embodiments, the inboard portions 430 are continuing to rotate outwardly along pathways 410 toward their fully deployed positions. The outboard portions 420 may rotate about an axis 500 along a pathway 510 due to gravitational force, aerodynamic force, or a combination of gravitational and aerodynamic force. In some embodiments, each axis 500 may be aligned along a direction that traverses a leading edge 515 and a trailing edge 516 of the wing assembly 160 (such as a chordwise direction). In some embodiments, each axis 500 may be aligned along a direction oriented at an angle relative to a chordwise direction of the wing assembly 160.

In some embodiments of the present technology, a joint 520 between the outboard portion 420 and the inboard portion 430 may not include a mechanism to force rotation of the outboard portions 420. For example, the joint 520 may include a hinge or other rotational joint that does not include a spring, motor, or other device to cause rotation of the outboard portion 420 relative to the inboard portion 430. In other words, the joint 520 may be operable without assistance of a spring or a motor. The present technology takes advantage of gravitational forces and aerodynamic forces to move the outboard portions 420 of the wing assemblies 160 into their deployed positions, as described in additional detail below. In FIG. 5, the other aerodynamic surfaces 180, such as horizontal stabilizers, vertical stabilizers, or vertazontals, may continue to rotate into their own deployed positions, along pathways 530 or other rotational pathways, or the other aerodynamic surfaces 180 may have completed their deployment at this point in the process.

Figure 6:
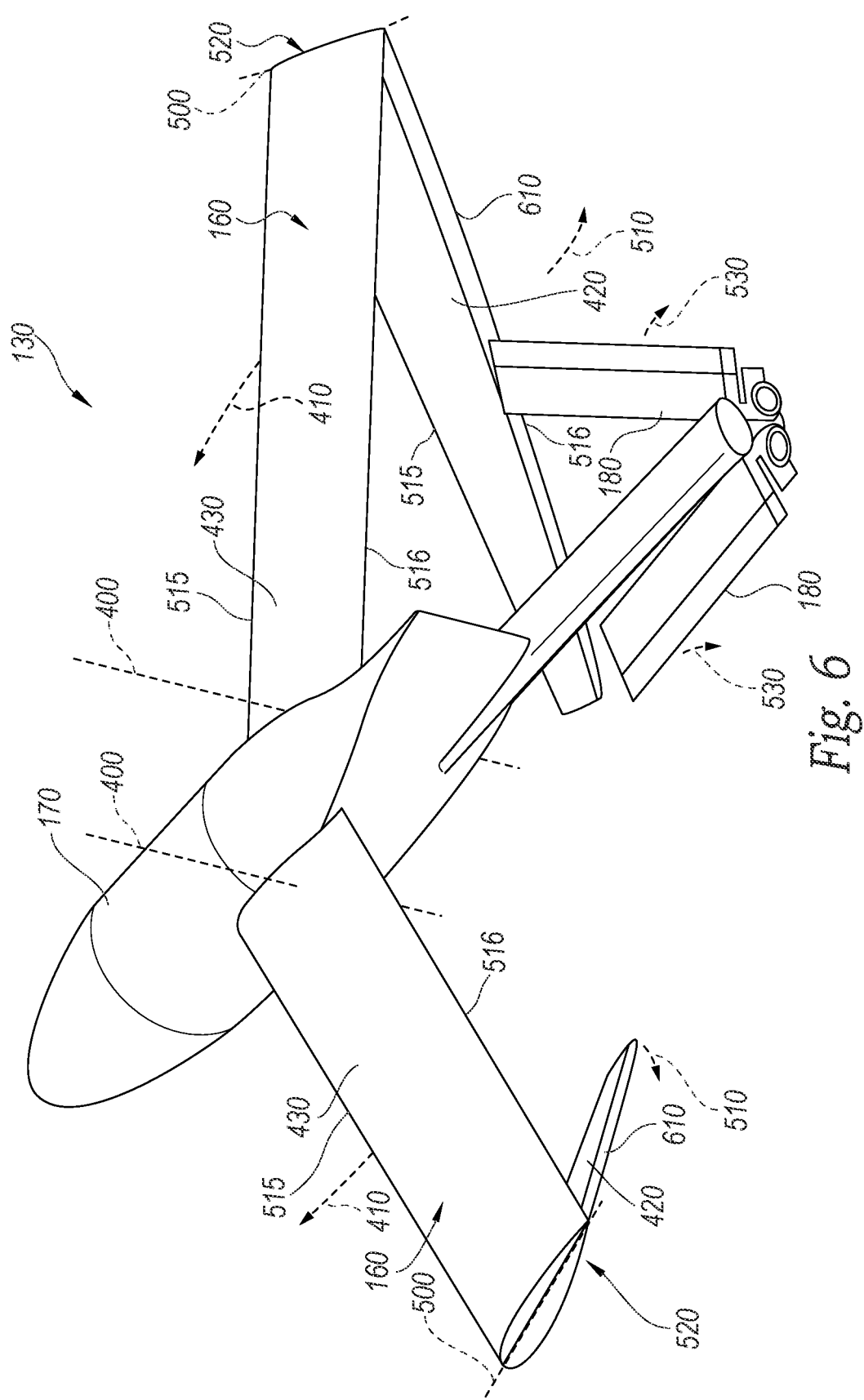

FIG. 6 illustrates a view of the aircraft 130 in another partially-stowed or partially-deployed configuration as the aircraft progresses along a launch trajectory (such as the trajectory 140 in FIG. 1). FIG. 6 shows the outboard portions 420 of the wing assemblies 160 continuing to rotate away from the inboard portions 430. In some embodiments, at some point during the deployment sequence, aerodynamic control surfaces, such as ailerons 610 on the trailing edges of the outboard portion 420, are deflected toward the corresponding inboard portions 430 of the wing assemblies 160 to cause aerodynamic forces to push the outboard portions 420 toward their deployed positions. When the wing assemblies 160 are fully deployed, the ailerons 610 may function as standard ailerons for normal or nominal flight.

In some embodiments, deflection of the ailerons 610 to cause rotation of the outboard portions 420 may be significantly more than deflection of the ailerons 610 during normal flight, or, in other embodiments, the ailerons 610 may need to deflect only enough to provide aerodynamic force downward, outward, and then upward on the outboard portions 420 to cause them to move to the deployed position (along pathways 510). The aerodynamic force from the ailerons 610 causes rotation and deployment of the outboard portions 420 without a need for—and preferably in the absence of—springs, motors, or other driving devices to cause the rotation and deployment of the outboard portions 420. The ailerons 610 may be deflected into a position to cause rotation of the outboard portions 420 at any time in the launch sequence, for example, before expulsion from the tube, after the inboard portions 430 have begun spreading from the fuselage 170, after the outboard portions 420 have begun to drop away from the inboard portions 430, or at any other suitable time during the launch sequence, when aerodynamic forces instead of spring or motor forces may be used to deploy the outboard portions 420 to a flight configuration.

Figure 7:
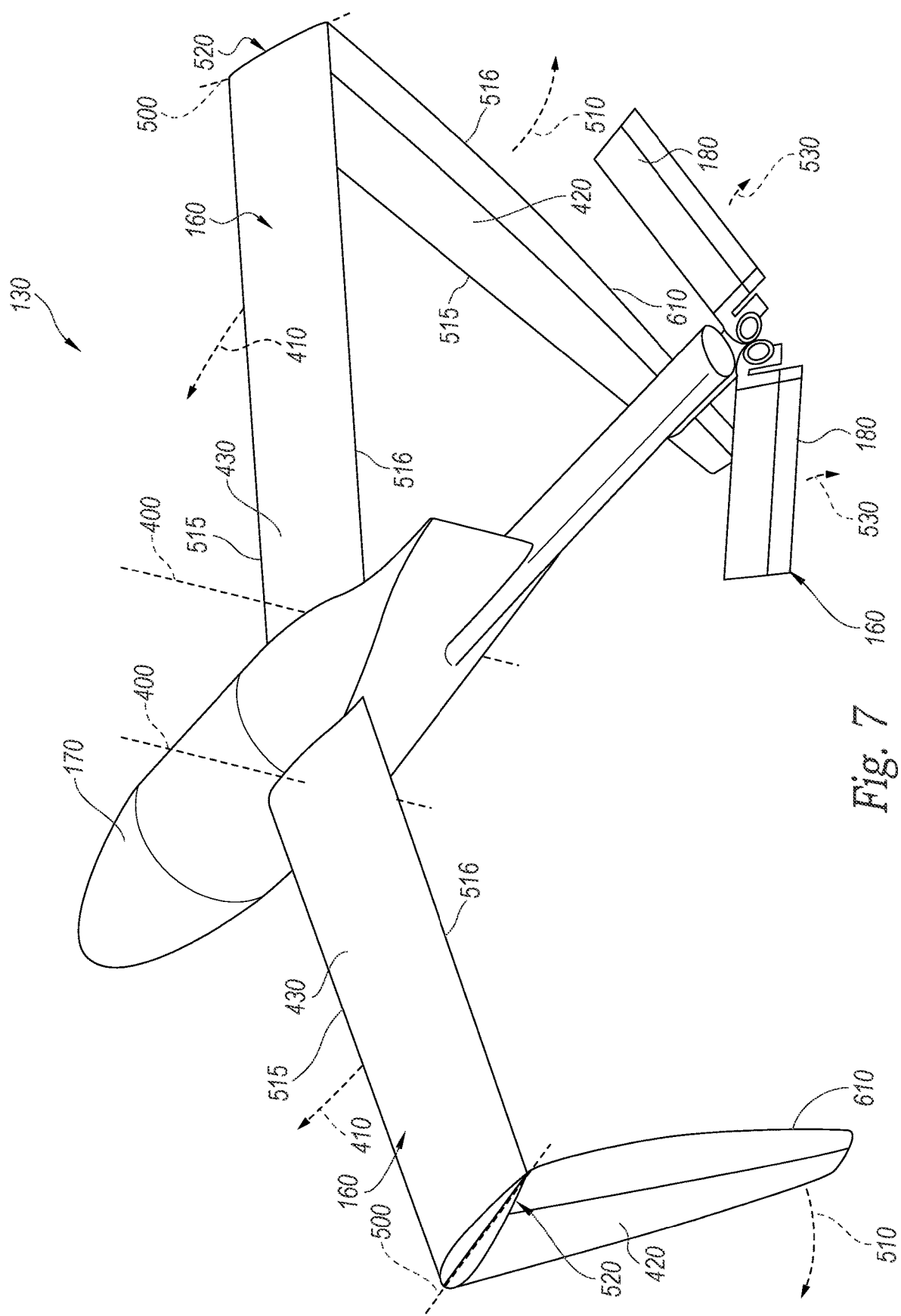

FIG. 7 illustrates a view of the aircraft 130 in another partially-stowed or partially-deployed configuration as the aircraft progresses along a launch trajectory (such as the trajectory 140 in FIG. 1). FIG. 7 shows the outboard portions 420 of the wing assemblies 160 continuing to rotate away from the inboard portions 430, and toward their fully deployed positions. The deflection of the ailerons 610 may continue to cause aerodynamic force to push the outboard portions 420 away from the inboard portions 420 and closer to a fully extended position for normal flight.

Figure 8:
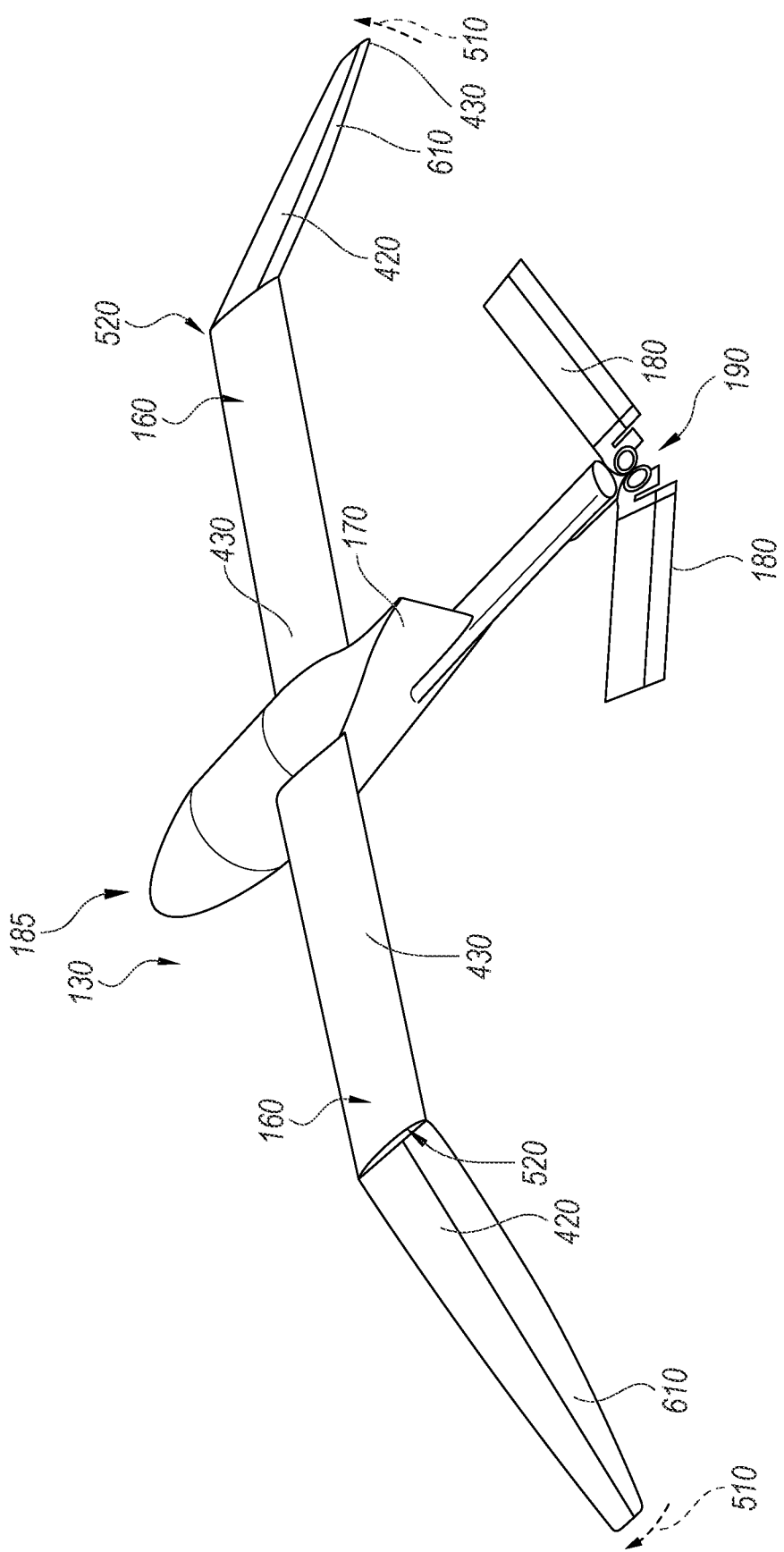

FIG. 8 illustrates another view of the aircraft 130 as it progresses along the launch trajectory and through the deployment sequence. At some point, either immediately after expulsion from the tube 120 (see FIG. 1) or another launch system, or in the middle of the sequence, or after full deployment of the wing assemblies 160, the other aerodynamic surfaces 180, such as the surfaces at the rear of the aircraft 130, complete their deployment (by force from a spring, motor, or aerodynamics). In some embodiments, timing of deployment of some aerodynamic surfaces may depend on whether other aerodynamic surfaces are clear of the deployment pathway of each aerodynamic surface. Accordingly, in some embodiments, some aerodynamic surfaces may deploy before or after others. For example, the other aerodynamic surfaces 180 at the rear of the aircraft 130 may deploy after the wing assemblies 160 are out of their deployment pathway.

Figure 9:
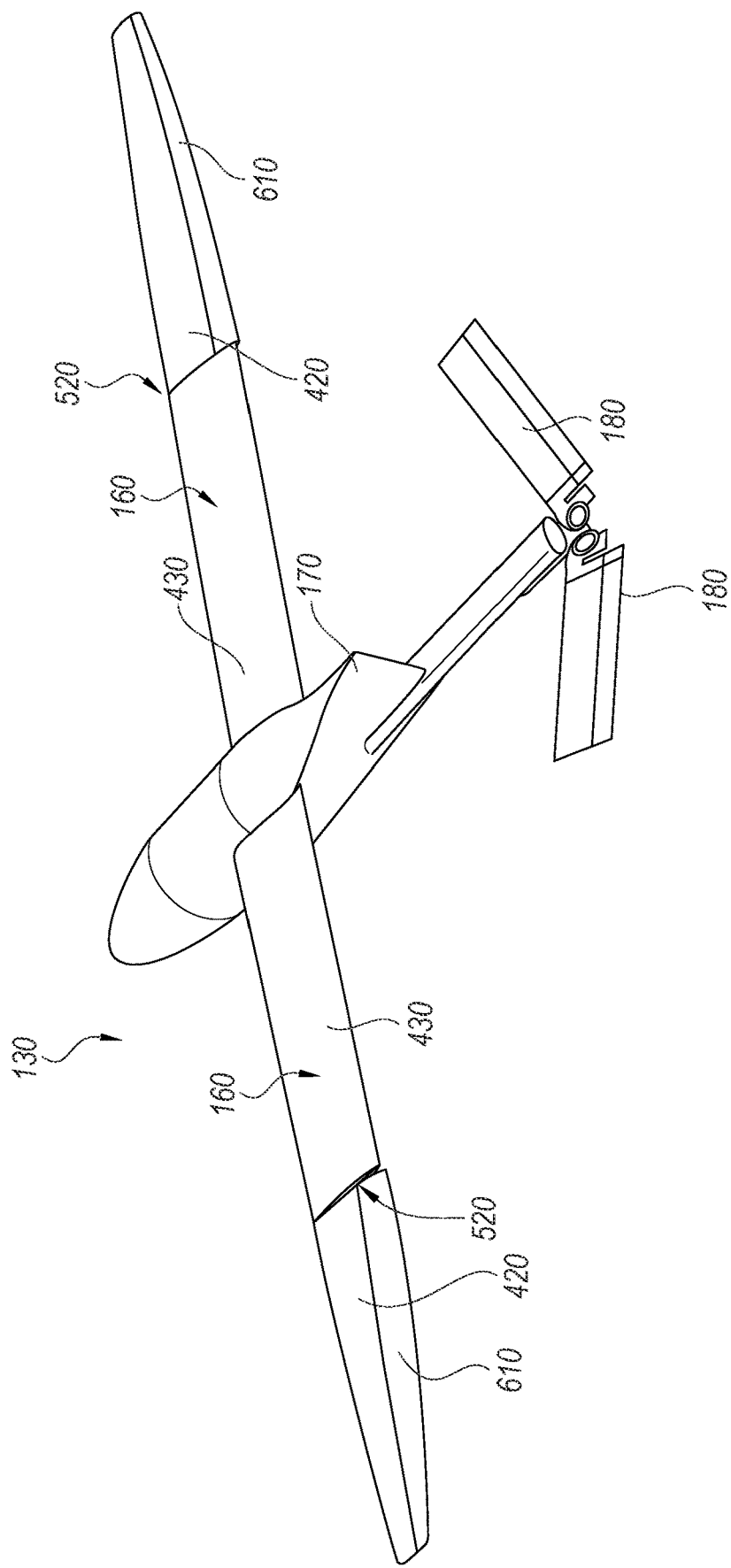
FIG. 9 illustrates a view of the aircraft in a fully deployed configuration suitable for flight, in accordance with an embodiment of the present technology.

FIG. 9 illustrates a view of the aircraft 130 in a fully deployed configuration 150 (see FIG. 1). At this point, the wing assemblies 160 have fully rotated into their deployed orientation, including the outboard portions 420 which have been pushed upward toward their own deployed orientations (such as generally parallel to the inboard portions 430, for example) by aerodynamic force from the ailerons 610. In some embodiments, the outboard portions 420 may be locked into position by a latching device, an example of which is described below with regard to FIG. 14. Other latching devices may lock other portions of the wing assemblies 160 or the other aerodynamic surfaces 180 into their respective flight positions.

Figure 10:
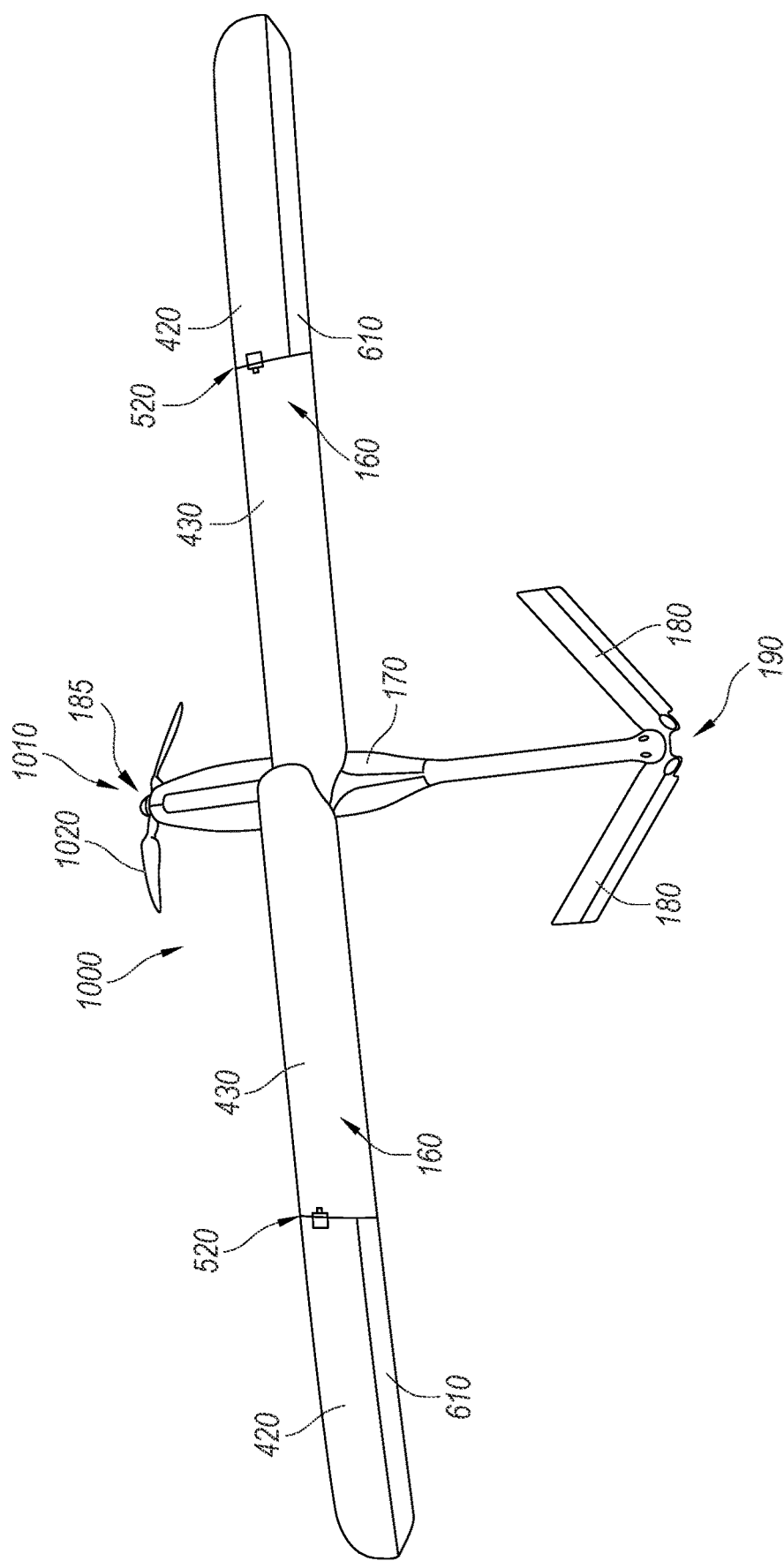
FIG. 10 illustrates a perspective view of an aircraft according to another embodiment of the present technology, in a deployed configuration suitable for flight.

FIG. 10 illustrates a perspective view of an aircraft 1000 according to another embodiment of the present technology, in a deployed configuration (like the deployed configuration 150 in FIG. 1). In some embodiments, the wing assemblies 160 may not overlap each other in a deployed configuration, or in some embodiments, the wing assemblies 160 may partially overlap each other even in a deployed configuration. Such an overlapping arrangement may facilitate a more compact stowed configuration. The wing assemblies 160 may pivot or rotate about a common axis, or they may pivot or rotate about their own individual axes.

To simplify illustration, FIGS. 2-9 do not illustrate a propulsion system, although it is understood that propulsion systems suitable for propelling aircraft may be implemented on embodiments of the present technology. For example, a propulsion system 1010, which may include a puller rotor 1020, may be positioned on a forward end of the aircraft 1000 (or the aircraft 130 in FIGS. 2-9), such as on a nose of the aircraft or on a wing assembly 160. Propulsion systems in various embodiments of the present technology may include rotors (propellers) rotated by electric motors (powered by one or more batteries, for example), or they may be rotated by turboprop engines, rotary engines, or other fuel-powered engines. Jet propulsion may be implemented in some embodiments. In further embodiments, the aircraft (1000, 130) may not include propulsion and may instead be a glider aircraft.

Large aspect ratio wing assemblies 160 are illustrated in the appended figures and may be used in some embodiments to provide long aircraft loiter times. However, other suitable geometries of wing assemblies 160 may be used in other embodiments, such as low-aspect-ratio wing assemblies, delta wings, wings with various degrees of tapering, forward swept wings, backward swept wings, straight wings, elliptical wings, gull wings, variable geometry wings, or other wing arrangements suitable for generating lift for aircraft. Wing assemblies may be divided into various portions, including more than two portions, several of which may be folded and aerodynamically deployed according to embodiments of the present technology. Accordingly, the wing assemblies 160 described and illustrated herein are merely examples of wing assemblies and other aerodynamic surfaces that may be unfolded with the aid of aerodynamic forces (either entirely unaided by springs, motors, or other mechanisms, or with only minimal aid from mechanisms). Other embodiments are included in the present technology. The aerodynamic folding concepts illustrated with regard to the wing assemblies 160 may be implemented in other embodiments that may not necessarily be wing assemblies but may be other lifting surfaces or other aerodynamic surfaces configured to provide lift.

Figure 11:
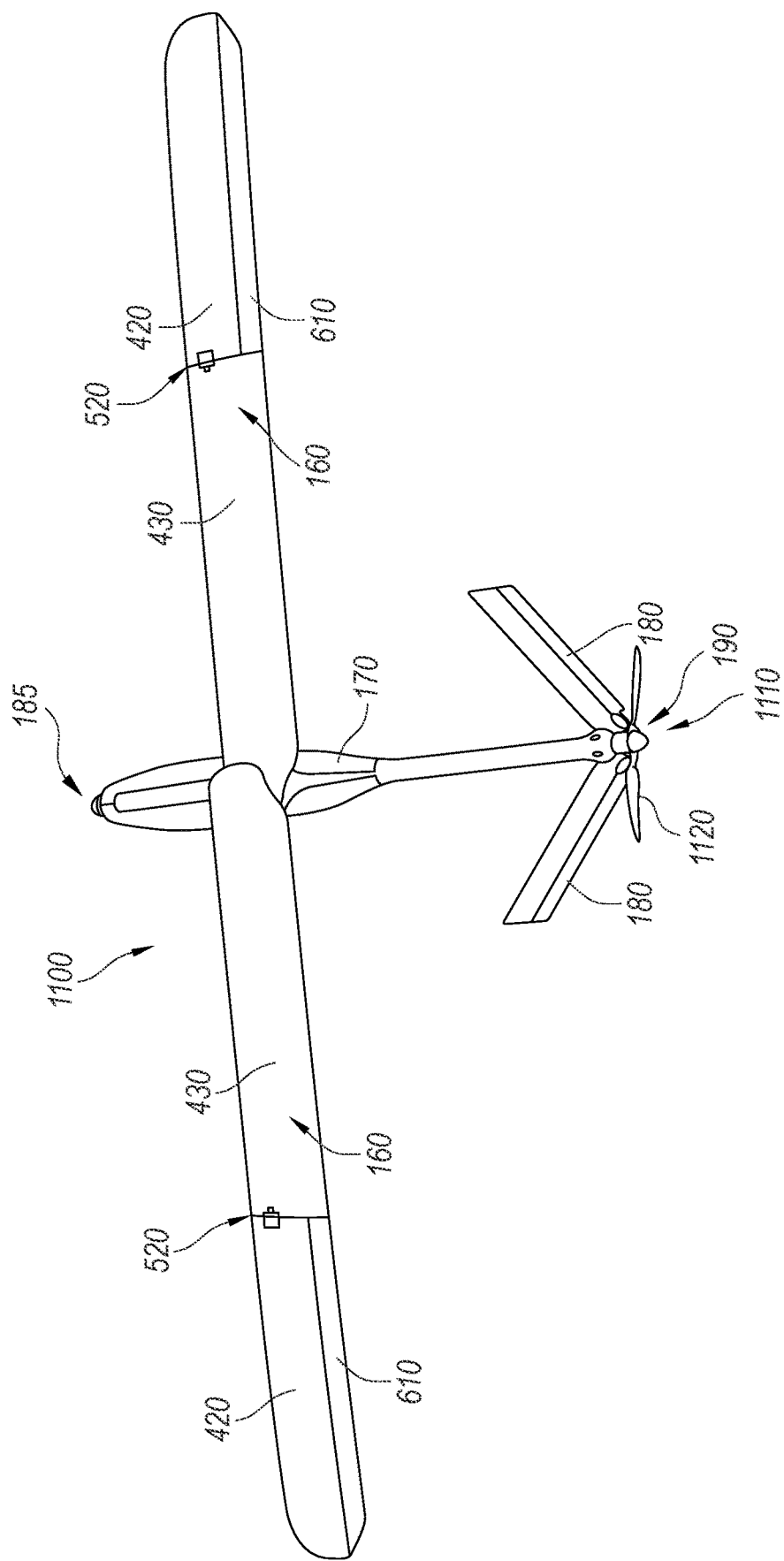
FIG. 11 illustrates a perspective view of an aircraft according to another embodiment of the present technology, in a deployed configuration suitable for flight.

FIG. 11 illustrates a perspective view of an aircraft 1100 according to another embodiment of the present technology, in a deployed configuration (like the deployed configuration 150 in FIG. 1). The illustrated aircraft 1100 is generally similar to other aircraft disclosed herein, except that it includes a propulsion system 1110 on a rear or trailing end of the aircraft, and it may include a pusher rotor 1120. Any arrangement, type, combination, or variation of propulsion systems suitable for providing thrust to an aircraft may be implemented in embodiments of the present technology. For example, in some embodiments, pusher rotors, puller rotors, jet engines, ramjet engines, rockets, or other suitable propulsion systems may be positioned in any suitable combination on the fuselage 170 or wing assemblies 160. In some embodiments, aircraft may include cameras, sensors, or other surveillance devices. In some embodiments in which the propulsion system 1010 includes rotors (such as the puller rotor 1020, or other rotors), one or more blades of the rotors may fold into a stowed configuration (for example, toward or around the fuselage 170) to fit in a launch system such as the tube launch system 210 described above.

Figure 12:
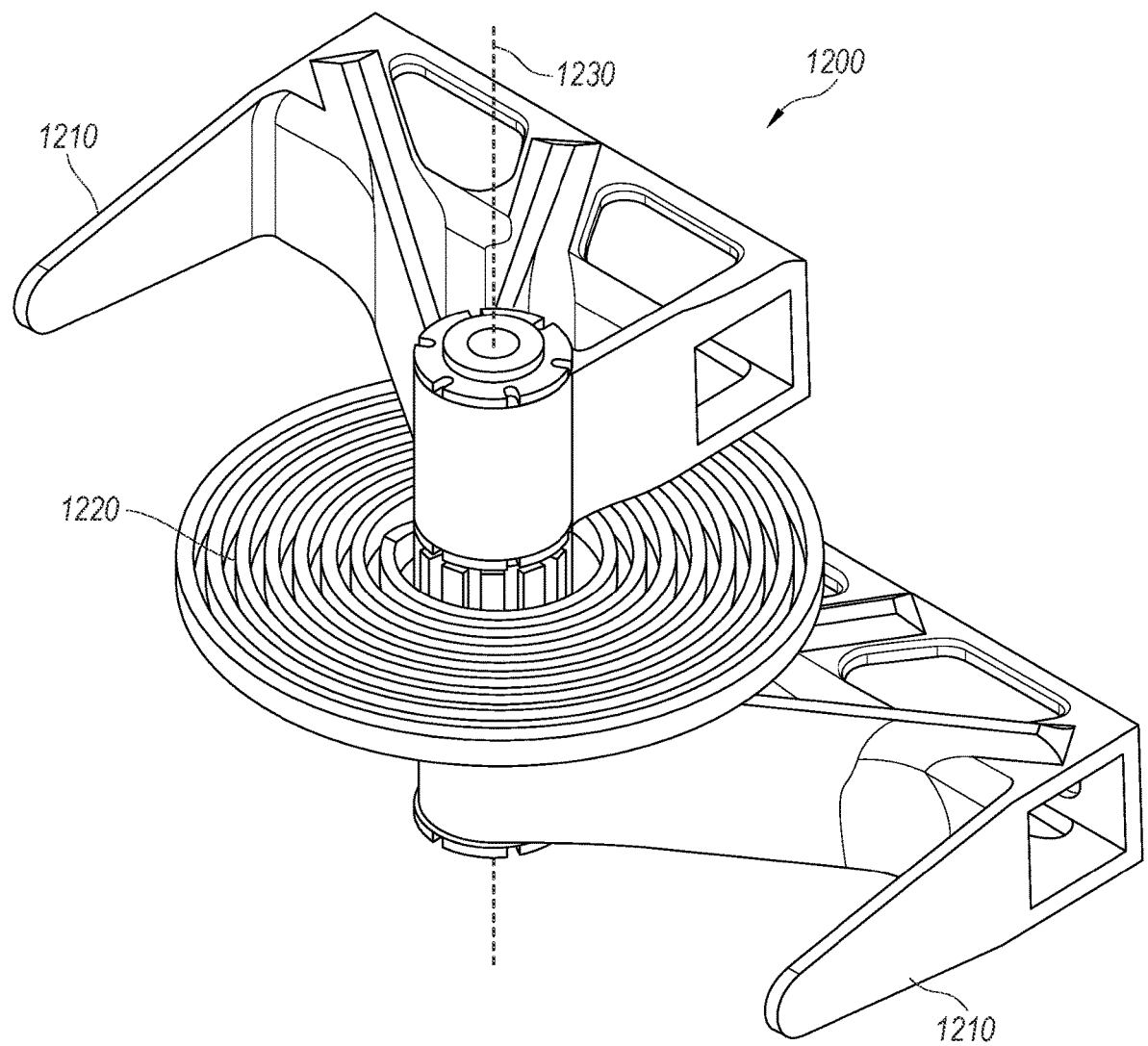
FIG. 12 illustrates an example mechanism for rotating wing assemblies away from a fuselage, according to an embodiment of the present technology.

FIG. 12 illustrates an example mechanism 1200 for rotating the wing assemblies 160 away from the fuselage 170. Such a mechanism 1200 may be positioned in the fuselage 170 and attached to the inboard portions 430 of the wing assemblies 160 to force the inboard portions 430 to rotate during the deployment sequence. The wing assemblies 160 may connect to the mechanism 1200 at interfaces 1210. The interfaces 1210 may be spring-biased toward an open or deployed configuration as shown (see the deployed configuration 150 in FIG. 1, or the configurations in FIGS. 9 and 10, for example) to cause the wing assemblies 160 to be biased away from the fuselage 170. In some embodiments, a torsion spring 1220 may bias the interfaces 1210 away from each other and away from a stowed configuration (such as the stowed configuration 200 in FIG. 2). In some embodiments, the interfaces 1210 may rotate about a common axis 1230. In some embodiments, the common axis 1230 may be, but need not be, generally aligned with a yaw axis of the aircraft 130. The mechanism 1200 illustrated in FIG. 12 is merely one example of a mechanism capable of driving the wing assemblies 160 apart toward the deployed configuration, and other mechanisms may be used, including motors or other spring-driven mechanisms. In some embodiments, the wing assemblies 160 may not share a common rotational axis, and there may be more than one mechanism to push the wing assemblies 160 toward a deployed configuration.

In some embodiments, there may only be a spring or motor force driving the overall wing assemblies 160 toward a deployed configuration, while there may be no spring or motor between the inboard portions 430 and the outboard portions 420 of the wing assemblies 160, as the full deployment of outboard portions 420 may rely exclusively on aerodynamic forces generated by the outboard portion 420 or its ailerons 610, or other aerodynamic surfaces associated with the outboard portions 420.

Figure 13:
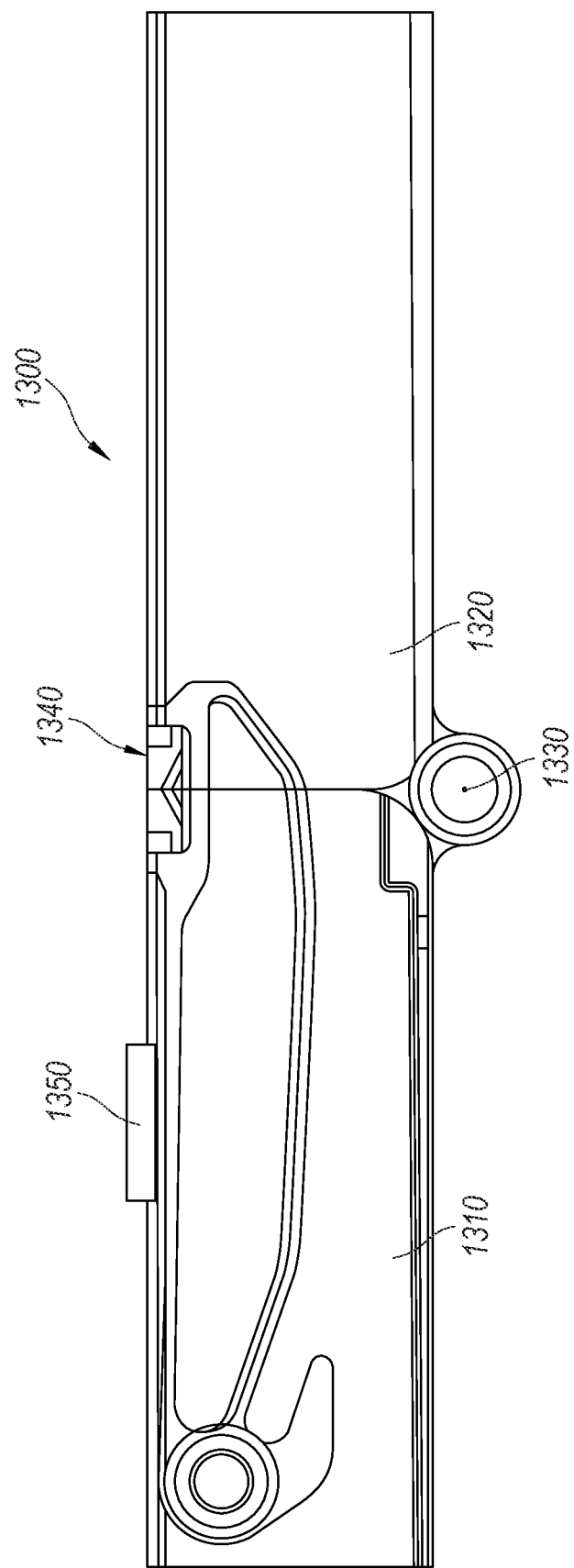
FIG. 13 illustrates a side-cross-sectional schematic view of a hinge that may be implemented in the joint between portions of a wing assembly, such as between the outboard portion and the inboard portion (shown in FIGS. 5-11, for example), according to an embodiment of the present technology.

FIG. 13 illustrates a side-cross-sectional schematic view of a hinge 1300 that may be implemented in the joint 520 between portions of a wing assembly 160, such as between the outboard portion 420 and the inboard portion 430 (see FIGS. 5-11), according to an embodiment of the present technology. The hinge 1300 may facilitate the aerodynamically-driven rotation of the outboard portion 420 toward the deployed position, as described above. The hinge 1300 may include a first hinge arm 1310 that is rotatably connected to a second hinge arm 1320 at a hinge axis 1330. The hinge axis 1330 may be aligned with the axis 500 shown in FIGS. 5, 6, and 7, it may be aligned with a chordwise direction of the wing assembly, or it may have other orientations sufficient to facilitate rotation between the wing portions without the aid of a spring or motor. In FIG. 13, the hinge 1300 is shown closed and latched by an optional latching device 1340, which, upon latching, prevents the first hinge arm 1310 and the second hinge arm 1320 from rotating relative to each other until the latching device 1340 is released.

In some embodiments, an outboard portion 420 of a wing assembly 160 may be mounted on, attached to, or contain the first hinge arm 1310 or the second hinge arm 1320, while an inboard portion 430 of a wing assembly 160 may be mounted on, attached to, or contain the other hinge arm (1310 or 1320). In such a configuration, the inboard portion 430 and the outboard portion 420 may generally freely rotate relative to each other about the hinge axis 1330 until they are locked together in a deployed configuration by the latching device 1340. Accordingly, gravity, aerodynamic force, or a combination of gravity and aerodynamic force drives the outboard portion 420 outward and upward relative to the inboard portion 430 of the wing assembly 160 until the latching device 1340 locks the outboard portion 420 in a deployed configuration (see FIGS. 9, 10, 11). In some embodiments, a release element, such as a button 1350, may be moved, such as toward the hinge 1300, to cause the latching device 1340 to release to allow a user to manipulate the aircraft 130 into a stowed configuration (for example, by folding the outboard portion 420 under the inboard portion 430).

Although the hinge 1300 may facilitate free rotation during deployment and then locking of the joint 520, other hinges may be used to facilitate free rotation of the outboard portion 420 relative to the inboard portion 430 to allow aerodynamic force to deploy the outboard portion 420. In some embodiments, a latching device 1340 may be omitted and the outboard portion 420 may be held in a deployed position by other features or by aerodynamic force (such as the lift force generated by the outboard portion 420 during flight).

Figure 14:
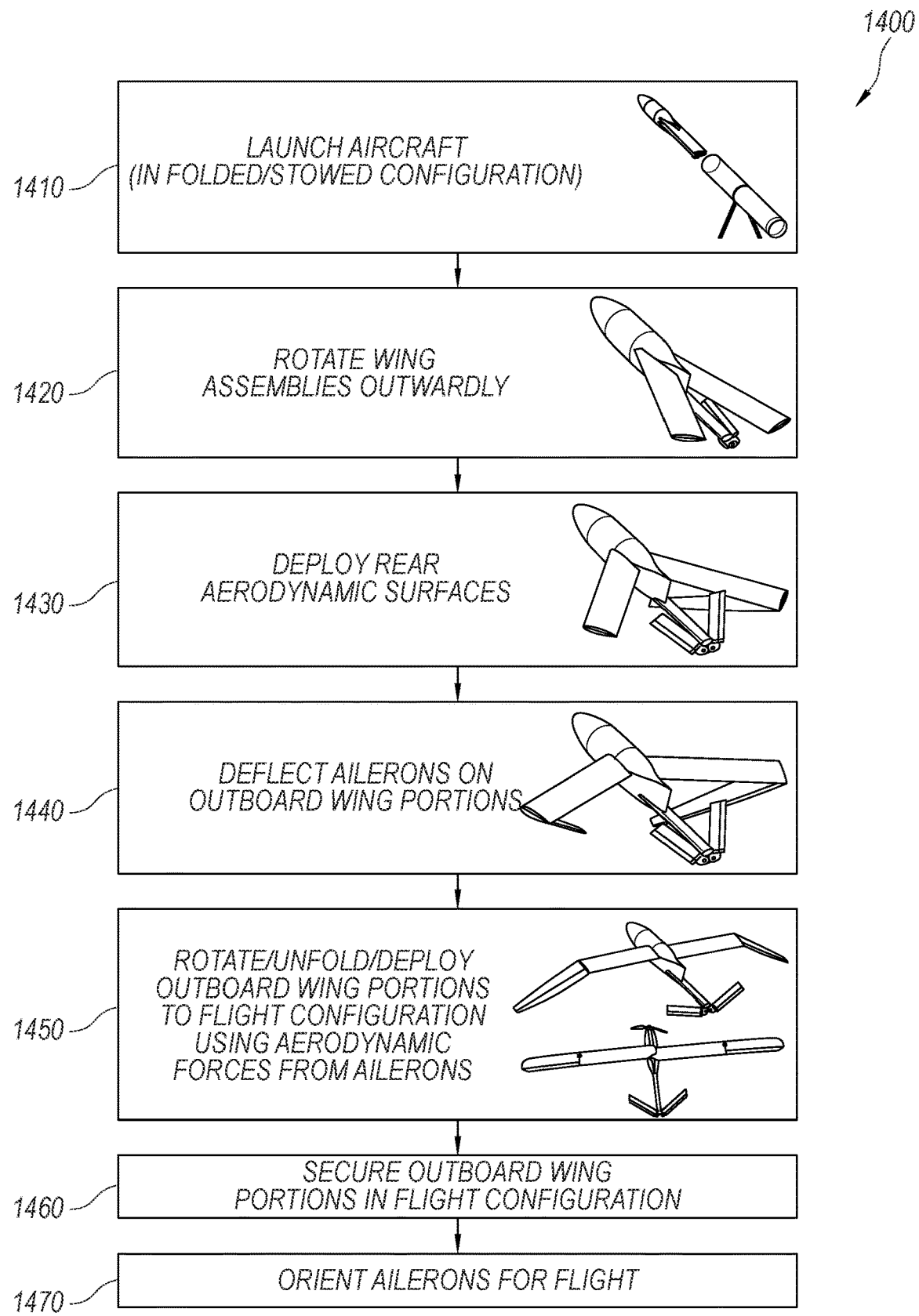
FIG. 14 illustrates a method of aerodynamic deployment of wing structures according to an embodiment of the present technology.

FIG. 14 illustrates a method 1400 of aerodynamic deployment of wing structures according to an embodiment of the present technology. In block 1410, the aircraft (such as the aircraft 130, 1000, 1100 described above) is launched or expelled from a launch system, such as a tube 120 (see FIG. 1), along an initial trajectory (140, see FIG. 1). The aircraft may remain in a stowed configuration (200, see FIG. 2) momentarily but, in block 1420, the wing assemblies 160 begin rotating outwardly, by force of a mechanism 1200 (see FIG. 12) or a motor, or another suitable device. In block 1430, When the wing assemblies 160 have cleared the rotational pathway of the other (rear) aerodynamic surfaces (180, see FIG. 5), the other aerodynamic surfaces may deploy by rotating into position by a spring (such as a torsional spring), motor, or other mechanism, or by aerodynamic force. In block 1440, the ailerons (610, see FIG. 6) are deflected to create aerodynamic force against the outboard wing portions (420, see FIG. 6) or otherwise in a downward direction. The deflection of the ailerons may be performed at any suitable point during the deployment sequence, such as before expulsion from the tube or after gravity has caused the outboard wing portions to drop away from the inboard wing portions. In block 1450, the outboard wing portions are rotated, unfolded, and deployed to their flight configuration using the force from the ailerons. In block 1460, the outboard wing portions are secured in a flight configuration. In block 1470, the ailerons may be oriented for flight operations.

In some embodiments, aerodynamic deployment of wing structures may be timed or sequenced to prevent actions from occurring out of sequence, although various sequences are contemplated. For example, the ailerons may be oriented for flight operations before the outboard wing portions are fully deployed or secured in a normal flight configuration. In some embodiments, it may be desirable to only permit the other (rear) aerodynamic surfaces 180 to rotate into flight position when the wing assemblies 160 are clear of their opening pathway. In some embodiments, full deployment of aircraft according to the present technology may take place in approximately one second, from initiation of the launch from the tube 120 to a fully deployed configuration 150 (see FIG. 1). For example, aircraft may be clear of the tube 120 within 10 milliseconds from initiation of the launch process, the wing assemblies 160 may begin deployment at about 100 milliseconds, and deployment may be nearly complete at about 750 milliseconds. Accordingly, the present technology provides rapid opening and deployment sequences.

To position an aircraft in a launch system, such as the tube launch system 210 illustrated and described above with regard to FIG. 2, a user may push the various wings and surfaces into their stowed positions (in some embodiments, reversing the deployment sequence illustrated and described above). Any spring force associated with the wing assemblies 160 (for example, force created by the mechanism 1200 illustrated in FIG. 12 for deploying the inboard wing portions 430) may be restrained by the launch system, such as the inner diameter of the tube 120. Likewise, spring force associated with deployment mechanisms for the other (rear) aerodynamic surfaces 180 may be restrained by the tube 120 or by interference with the wing assemblies 160 when the wing assemblies 160 are in their stowed positions. In the stowed configuration, the user may position the aircraft in a launch system, such as within the launch tube 120. Although a tube launcher is described, other launch systems may be used. For example, if a tube 120 is not used, in some embodiments, the inboard portions 430 may be fixed and the outboard portions 420 may deploy using the aerodynamic deployment process explained herein. In some embodiments, aircraft may be reusable, such that they be launched, deployed, recovered, stowed, and launched again.

The present technology facilitates deployment of one or more aerodynamic surfaces, such as wings or portions of wings, without a spring, motor, or other device for providing mechanical force to operate a joint. Advantages of embodiments of the present technology include reduced weight and reduced complexity of deployable aircraft. For example, by omitting springs from one or more movable joints, the aircraft may be lighter and have fewer possible points of failure in the deployment sequence. In some embodiments, aircraft are lightweight and they facilitate additional payload weight and capacity compared to aircraft that use more deployment mechanisms.

From the foregoing, it will be appreciated that specific embodiments of the disclosed technology have been described for purposes of illustration, but that various modifications may be made without deviating from the technology, and elements of certain embodiments may be interchanged with those of other embodiments, and that some embodiments may omit some elements. For example, some aerodynamic surfaces may be deployed exclusively with forces from gravity or aerodynamics, and without any spring or motor assistance, but in some embodiments, minimal spring or motor assistance may be used to assist the gravitational or aerodynamic forces relied upon for deploying various aerodynamic surfaces. In some embodiments, outboard portions of wing assemblies may be generally horizontal or parallel to inboard portions, but in other embodiments, outboard portions may be oriented at oblique angles relative to the horizon or to the inboard portions of the wing assemblies when the wing assemblies are in the fully deployed configurations.

Although outboard portions 420 of wing assemblies 160 are described as deployable without the aid of springs or motors (instead relying on aerodynamic forces), other aerodynamic surfaces may also be deployed without the use of springs or other mechanisms (instead relying primarily or entirely on aerodynamic forces). For example, rear aerodynamic surfaces such as horizontal or vertical stabilizers, or vertazontals 180, may be deployed using aerodynamic forces generated by deflecting one or more portions of the aerodynamic surfaces, including aerodynamic control surfaces such as elevons, elevators, rudders, trim tabs, or other control surfaces. In some embodiments, other surfaces may be implemented that are dedicated solely to deploying the aerodynamic surfaces, such as various flaps or other surfaces, which may be on leading edges, trailing edges, or elsewhere on aerodynamic surfaces. Accordingly, the present technology contemplates aerodynamic deployment of aerodynamic surfaces using any suitable deflectable or non-deflectable surface to provide aerodynamic force sufficient to facilitate deployment. In various embodiments, not every element is required and certain elements may be omitted or combined.

Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology may encompass other embodiments not expressly shown or described herein, and the invention is not limited except as by the appended claims.

What is claimed is:

1. An aircraft comprising:
   a fuselage;
   a wing carried by the fuselage, wherein the wing comprises an inboard portion and an outboard portion, and wherein the outboard portion comprises a movable aerodynamic control surface; and
   a deployment system for deploying the wing from a folded configuration to an unfolded configuration, wherein in the folded configuration, the outboard portion overlaps the inboard portion, and in the unfolded configuration, the outboard portion and the inboard portion together extend away from the fuselage and form a lifting surface for providing aerodynamic lift to the aircraft;
   wherein the movable aerodynamic control surface is configured to deflect toward the inboard portion to provide an aerodynamic force to cause the outboard portion to rotate relative to the inboard portion toward the unfolded configuration; and
   wherein the deployment system comprises:
      a first hinge arm connected to the inboard portion;
      a second hinge arm connected to the outboard portion, wherein the second hinge arm is rotatably connected to the first hinge arm at a hinge axis; and
      a latching mechanism, wherein the latching mechanism is positioned to releasably lock the wing in the unfolded configuration.

2. The aircraft of claim 1, wherein the hinge axis is parallel to a chord of the wing.

3. The aircraft of claim 1, wherein the latching mechanism comprises a release element for releasing the wing from the unfolded configuration.

4. The aircraft of claim 1, wherein the wing does not include a spring or motor for providing force to move the outboard portion to the unfolded configuration.

5. The aircraft of claim 1, wherein the hinge axis is outside of the inboard portion and outside of the outboard portion when the wing is in the unfolded configuration.

6. The aircraft of claim 1, further comprising a mechanism for rotating the wing away from the fuselage from a stowed orientation in which the wing overlaps at least part of the fuselage, to a deployed orientation in which the wing extends away from the fuselage, wherein the mechanism comprises an interface positioned along an axis extending through the fuselage, and a spring positioned along the axis and connected to the interface, wherein the spring biases the interface and the wing away from the stowed orientation.

7. A wing for an aircraft, the wing comprising:
   a first wing portion forming one of an inboard portion or an outboard portion of the wing;
   a second wing portion forming the other of the inboard portion or the outboard portion of the wing;
   a movable aerodynamic control surface carried by the outboard portion;
   a first hinge arm connected to the first wing portion;
   a second hinge arm connected to the second wing portion and rotatably connected to the first hinge arm at a hinge axis; and
   a latching mechanism, wherein the latching mechanism includes a latch element positioned inside the first hinge arm, the second hinge arm, or both the first hinge arm and the second hinge arm;
   wherein:

the second hinge arm is rotatable between an unfolded configuration of the wing in which the outboard portion of the wing extends away from the inboard portion of the wing, and a folded configuration in which the outboard portion of the wing is rotated toward the inboard portion of the wing;

the movable aerodynamic control surface is positionable to cause an aerodynamic force to move the outboard portion toward the unfolded configuration; and the latching mechanism is positioned to releasably lock the wing in the unfolded configuration.

8. The wing of claim 7, wherein the hinge axis is parallel to a chord of the wing.

9. The wing of claim 7, wherein the hinge axis is oriented along a direction different from a chordwise direction of the wing.

10. The wing of claim 7, wherein the latching mechanism comprises a release element for releasing the wing from the unfolded configuration.

11. The wing of claim 7, wherein the wing does not include a spring or motor for providing force to move the hinge arms toward the unfolded configuration.

12. The wing of claim 7, wherein the hinge axis is outside of the first wing portion and the second wing portion when the wing is in the unfolded configuration, and wherein the hinge axis is below the wing when the aircraft is in flight.

13. A deployment system for deploying a wing of an aircraft, the deployment system comprising:
a first hinge arm;
a second hinge arm rotatably connected to the first hinge arm at a hinge axis; and
a latching mechanism, wherein the latching mechanism includes a latch element positioned inside the first hinge arm, the second hinge arm, or both the first hinge arm and the second hinge arm;
wherein:
the second hinge arm is rotatable between an unfolded configuration in which the second hinge arm abuts the first hinge arm and the second hinge arm extends away from the first hinge arm, and a folded configuration in which the second hinge arm is rotated away from the unfolded configuration;
there is not a spring, motor, or other mechanism for providing force to move the first hinge arm or the second hinge arm toward the unfolded configuration; and
the latching mechanism is positioned to releasably lock the deployment system in the unfolded configuration.

14. The deployment system of claim 13, wherein the latching mechanism comprises a latching device positioned opposite the hinge axis along a location where the second hinge arm abuts the first hinge arm in the unfolded configuration.

15. The deployment system of claim 13, wherein the latching mechanism is connected to a release element for releasing the deployment system from the unfolded configuration.

16. The deployment system of claim 15, wherein the release element includes a button positioned on a side of the first hinge arm.

17. The deployment system of claim 13, wherein the hinge axis is outside of the first hinge arm and the second hinge arm when the deployment system is in the unfolded configuration.

18. The deployment system of claim 13, further comprising a mechanism for rotating the wing away from another wing of the aircraft, wherein the mechanism comprises two interfaces positioned along a common axis, and a spring positioned between the interfaces and along the common axis, wherein each interface is connected to the spring, and wherein the spring biases the interfaces away from a first configuration and toward a second configuration that is different from the first configuration.

19. An aircraft comprising:
a fuselage;
a wing carried by the fuselage, wherein the wing comprises an inboard portion and an outboard portion; and
a deployment system for deploying the wing from a folded configuration to an unfolded configuration, wherein in the folded configuration, the outboard portion overlaps the inboard portion, and in the unfolded configuration, the outboard portion and the inboard portion together extend away from the fuselage and form a lifting surface for providing aerodynamic lift to the aircraft;
wherein the deployment system comprises:
(a) a first hinge arm connected to the inboard portion;
(b) a second hinge arm connected to the outboard portion, wherein the second hinge arm is rotatably connected to the first hinge arm at a hinge axis; and
(c) a latching mechanism, wherein the latching mechanism is positioned to releasably lock the wing in the unfolded configuration; and
wherein the wing does not include a spring or motor for providing force to move the outboard portion to the unfolded configuration.

20. A wing for an aircraft, the wing comprising:
a first wing portion forming one of an inboard portion or an outboard portion of the wing;
a second wing portion forming the other of the inboard portion or the outboard portion of the wing;
a first hinge arm connected to the first wing portion;
a second hinge arm connected to the second wing portion and rotatably connected to the first hinge arm at a hinge axis; and
a latching mechanism, wherein the latching mechanism includes a latch element positioned inside the first hinge arm, the second hinge arm, or both the first hinge arm and the second hinge arm;
wherein:
the second hinge arm is rotatable between an unfolded configuration of the wing in which the outboard portion of the wing extends away from the inboard portion of the wing, and a folded configuration in which the outboard portion of the wing is rotated toward the inboard portion of the wing;
the wing does not include a spring or motor for providing force to move the hinge arms toward the unfolded configuration; and
the latching mechanism is positioned to releasably lock the wing in the unfolded configuration.

* * * * *